E. T. MUSSON.
WING JIG.
APPLICATION FILED APR. 16, 1917.
1,434,559.
Patented Nov. 7, 1922.
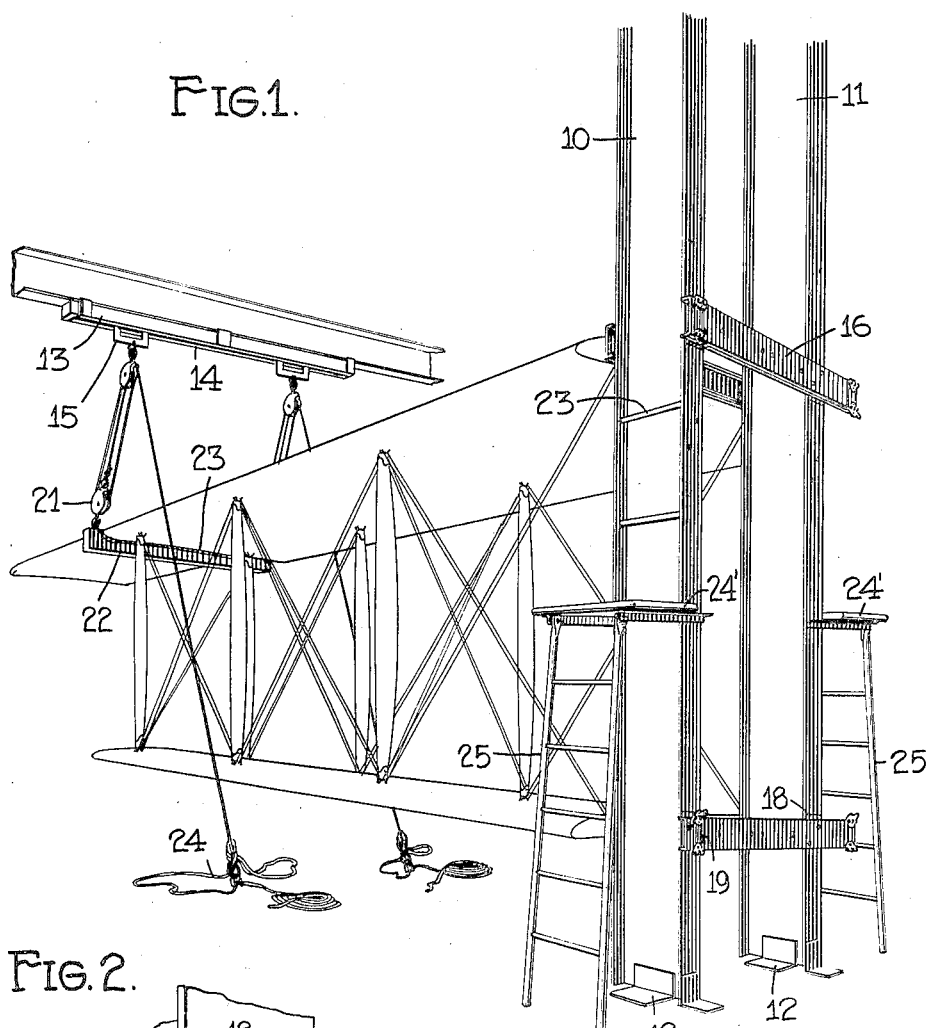
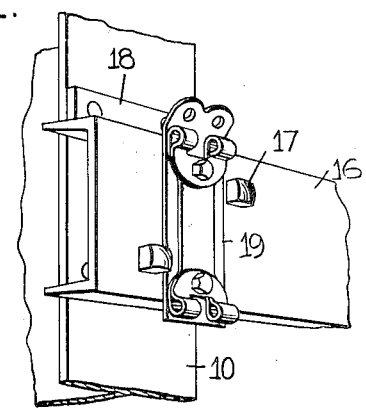
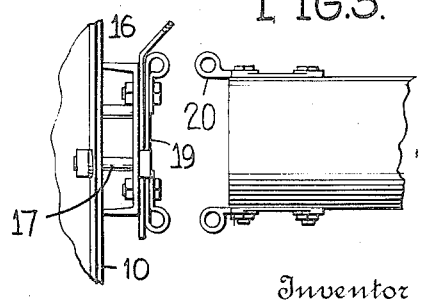
Inventor
EDWARD T. MUSSON
By
Attorney Patented Nov. 7, 1922.

1,434,559

UNITED STATES PATENT OFFICE.

EDWARD T. MUSSON, OF TORONTO, ONTARIO, CANADA, ASSIGNOR TO CURTISS AEROPLANE AND MOTOR CORPORATION, A CORPORATION OF NEW YORK.

WING JIG.

Application filed April 16, 1917. Serial No. 162,542.

*To all whom it may concern:*

Be it known that I, EDWARD T. MUSSON, a citizen of the United States, residing at Toronto, in the Province of Ontario and Dominion of Canada, have invented certain new and useful Improvements in Wing Jigs, of which the following is a specification.

My invention relates to aircraft factory equipment and has reference more particularly to assembly forms or wing jigs (as they are familiarly known) in which provision is made for the assembly thereon of the complete wing structure of an aeroplane.

In the manufacture of aircraft, especially aeroplanes, it is customary and in fact essential that the various units be made separately according to specification and assembled to determine accuracy of fit and coordination. After assembly the craft is dismantled, the units or parts separately packed, shipped, and finally re-assembled for actual flight. The initial assembly takes place at the factory and the final assembly in the hangar or on the field of initial flight. Since the former is in no sense final and the parts are only assembled to determine the fitness of the craft before shipment, permanent devices or factory equipment of a particular characteristic may be installed. With this in view it is the prime desideratum of the invention to install permanently a wing jig of novel construction upon which wing structures of varying form may be expeditiously and quickly assembled with a minimum of work and greatly reduced cost due to time and labor saved. This jig comprises essentially longitudinally spaced upright beams and adjustable and removable horizontally disposed cross beams, the former supporting the latter and the latter carrying wing hinges vertically spaced to give proper placement and proper angle of incidence to the aeroplane wings which, in the assembly of the wing structure, are attached thereto. After attachment of the upper wing beams or wing panels, assembly of the wing structure in its entirety is proceeded with and the finished completely assembled unit produced. All tie wires, wing posts, turnbuckles, sockets, etc. are assembled after the upper wing or panel is set. The fitness and characteristics of the finished structure can in this way be determined and the structure quickly knocked down, packed and shipped.

Heretofore, in assembling a wing structure the beams or panels have been directly anchored to the hull or body of the craft. This procedure, although answerable, is objectionable in that each wing structure can only be assembled at large cost and an expenditure of considerable time. Furthermore, permanent equipment cannot be used as an aid to assembly for the reason that the location of the hull or body determines the place of assembly of the wings.

Of the drawings:

Fig. 1 is a perspective view of the device of my invention in its entirety, one-half of a complete biplane wing structure having been assembled thereon;

Fig. 2 is a fragmentary perspective view of the fastening for one of the cross beams, and Fig. 3 is an end elevation of one of said beams illustrating the fastening complete, although detached.

While I have illustrated and shall hereinafter describe my improved wing jig or assembly form as forming an integral or permanent part of an aeroplane factory, said device may be separately constructed and hence made portable. Permanency, however, for rigidity and strength, is desired. Upright I-beams or channel beams 10 and 11, spaced and parallel, constitute the basis or supporting structure of the assembly form. Said beams 10 and 11 are fastened as indicated at 12 by any suitable means directly to the floor, the beams at their opposite ends directly engaging the rafters or girders of the ceiling. Laterally spaced out from the sides of the beams 10 and 11 a fixed track 13 is provided, this to engage the ceiling or one of the girders thereof. Said track or trackway is preferably longitudinally slotted as indicated at 14 to receive in the groove thus formed properly spaced travelling supports 15 adjustable longitudinally of the track or trackway.

Removable and adjustable cross beams 16 (four in number) are fastened to the uprights 10 and 11, the point of attachment being predesignated and predetermined to agree with the determined angle of incidence of the wings to be assembled. Bolts 17 constitute the cross beam fastening means and stop blocks 18 the means for quickly determining proper placement of said beams. Any number of stop blocks 18 may be provided.

Each cross beam is terminally equipped (although not necessarily terminally) with hinge plates 19 of an accepted design. These hinge plates are removable and preferably of a standard type to receive complementally the hinge parts 20 of the aeroplane wings. Said hinge plates 19 can be made adjustable longitudinally of the cross beams to accommodate wings of varying chord length or wings in which the location of the wing beams are at variance.

Each travelling support 15 carries a block and tackle 21, the blocks and tackles in turn collectively supporting an adjustable cross beam 22. The upper face of said beam 22 is preferably grooved and padded as indicated at 23 to provide a soft adhesive bed or covering for the upper panel of the wing structure to be assembled upon the jig. If desired, anchorages 24 may be provided upon the floor for fastening the bar 22 in its adjusted position.

In use, and after proper adjustment of the cross beam 16, the upper wing or wing section where the wing is divided centrally, is arranged with its outer terminal or tip over the cross bar 22 and through manipulation of the block and tackle devices 21 raised to a position in line with the upper cross beam 16. The inner terminal of the upper wing is then lifted and hinged by the usual hinge fastening means to said cross beam 16, the angle of incidence being thus automatically determined by reason of the set position of said beams. After having positioned the upper wing as desired, the remaining parts of the wing structure are assembled, commencing at the upper wing and working down until the wing structure in its entirety is completely assembled, the lower wing, of course, engaging the lower cross beam to which it is hingedly connected in a manner similar to the hinge connection of the upper wing. All the many wing parts, that is the wing posts, tie wires, sockets, etc., can be assembled quickly and properly that the fitness of the wing structure may be determined in exactly the same manner as assembled finally upon the hull or body of the machine. For convenience, the uprights 10 and 11 may be provided with rungs 23 constituting a ladder and with opposed platforms 24 (one for each upright) upon which the workmen may stand while fastening the upper wing in place. Ladders 25 lead from the floor to each platform 24.

By the use of a wing jig thus constructed, the initial assembly of the wing structure is facilitated greatly and at a considerable reduction both in cost and labor. Uniformity of the wing parts is assured and the possibility of an incomplete shipment prevented. Moreover, a single jig, through adjustment of the cross beams, may be utilized as an aid in the assembly of wing structures varying greatly in gap, chord and angle of incidence.

While in the foregoing there has been illustrated in the drawings and described in the specification such combination and arrangement of elements as constitute the preferred construction or embodiment of this invention, it is nevertheless desired to emphasize the fact that interpretation of the invention should only be conclusive when made in the light of the subjoined claims.

What is claimed is:

1. In an apparatus for assembling airplane wing structures, the combination, of an upright support, a transverse member carried by and adjustable vertically relatively to the support, and spaced hinge members carried by the transverse member and adjustable away from and toward each other, said hinge members being adapted to receive and engage the mating hinge members of the airplane wing.

2. In an apparatus for assembling airplane wing structures, the combination, of an upright support comprising spaced uprights, a cross member carried jointly by the spaced uprights and adjustable vertically relatively to the support to vary the angular relation of said cross member to said support, and separate hinge members carried by the cross member and adjustable longitudinally thereof, said hinge members being adapted to receive and engage the mating hinge members of the airplane wing.

3. In an apparatus for assembling airplane wing structures, in combination, an upright support having adjustable hinge members thereon for receiving and engaging the hinge members of the wing, and a spaced auxiliary support adapted to engage the airplane wing at a point remote from said hinge members, said auxiliary support being adjustable vertically to raise and lower that end of the wing structure which it supports.

4. In an apparatus for assembling aeroplane wings, in combination, an upright support having an adjustable hinged member thereon for receiving and engaging the wing hinge, and an auxiliary support engaging the underside of the wing, said auxiliary support being laterally removed from the upright support and vertically adjustable for cooperation therewith.

5. In an apparatus for assembling airplane wing structures in combination, an upright support having an adjustable hinge member thereon for receiving and engaging the wing hinge members, and a spaced auxiliary support adapted to engage the under side of the wing, said auxiliary support being adjustable to raise and lower the opposite end of the wing structure.

In testimony whereof I hereunto affix my signature.

EDWARD T. MUSSON.